Jan. 20, 1959 F. COREY ET AL 2,869,172
POULTRY PROCESSING EQUIPMENT
Filed July 8, 1955 3 Sheets-Sheet 1

INVENTORS.
FLOURNOY COREY
ROBERT D. PITTS
BY FREDERICK C. COREY

Flournoy Corey
ATTORNEY.

Jan. 20, 1959
F. COREY ET AL
2,869,172
POULTRY PROCESSING EQUIPMENT
Filed July 8, 1955
3 Sheets-Sheet 2
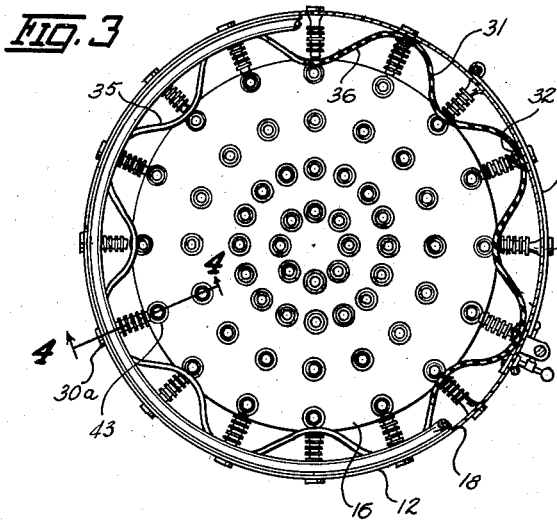
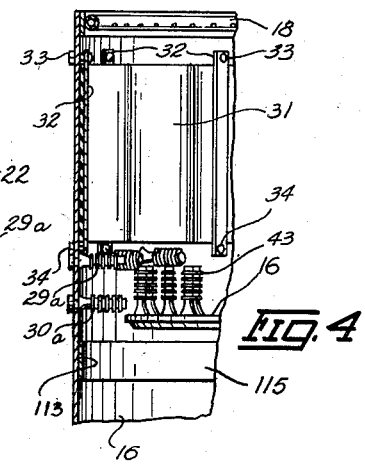
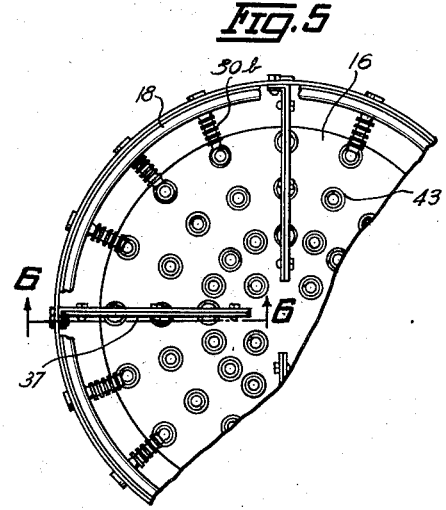
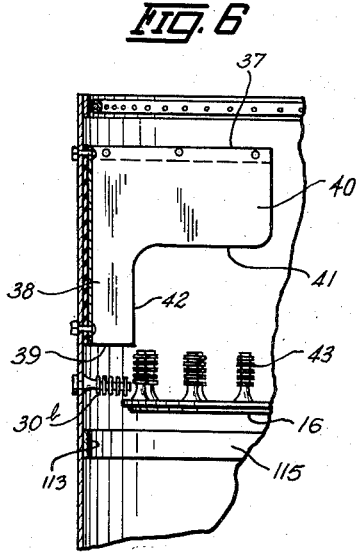
INVENTORS.
FLOURNOY COREY
ROBERT D. PITTS
BY FREDERICK C. COREY
*Flournoy Corey*
ATTORNEY.

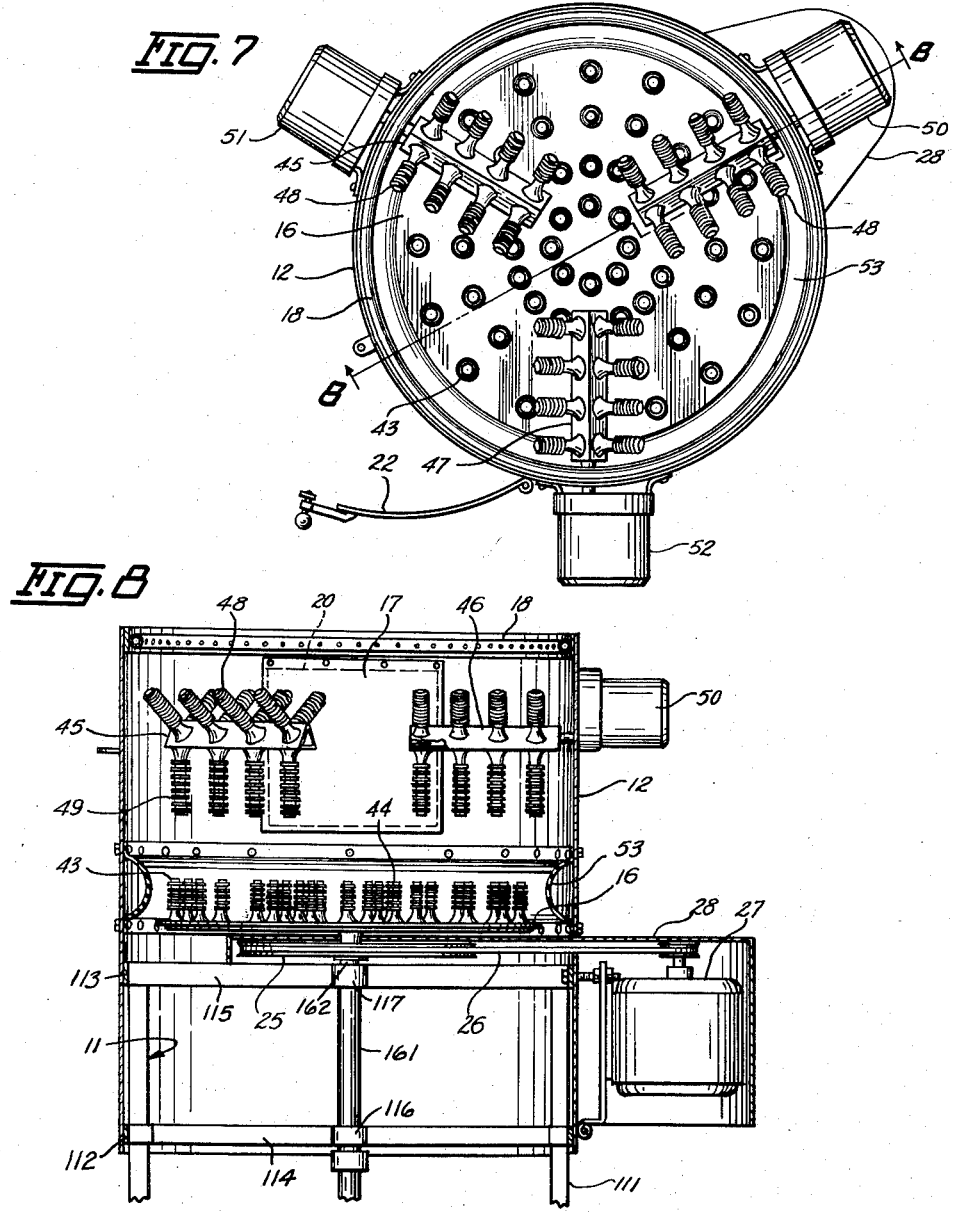

United States Patent Office 2,869,172
Patented Jan. 20, 1959

2,869,172

POULTRY PROCESSING EQUIPMENT

Flournoy Corey, Frederick C. Corey, and Robert D. Pitts, Cedar Rapids, Iowa, assignors to Pickwick Company, Cedar Rapids, Iowa, a corporation of Iowa Application July 8, 1955, Serial No. 520,681

4 Claims. (Cl. 17—11.1)

This invention relates to poultry processing equipment and has particular relation to pressure applying and defeathering means in conjunction with a disc type defeathering machine, such as more fully described in our application Serial No. 489,468, which issued as U. S. Patent No. 2,777,158 on January 15, 1957.

The applicants have invented a new and novel defeathering machine which consists generally of a cylindrical casing having a disc mounted a substantial distance below the top of the casing. This disc is provided with a number of defeathering members and is adapted to rotate at a substantial rate of speed, the poultry being placed within the casing on top of this revolving disc. The casing is further provided with a series or plurality of defeathering members about the inside circumference adjacent to the revolving disc, whereby the poultry or fowl to be picked will be subjected to the action of the feather removing members both on the disc and the casing.

In the type of device described, the nature of the feather removing means on the casing walls is of extreme importance. These members both remove feathers and serve to hold the fowl in position against the feather removing members of the rotating disc. It is, at the same time, important that these secondary feather removing members should not completely stop the movement of the bird, but rather that they impart some motion to the bird and permit intermittent advancing rotary movement of the bird by the disc, and that any stoppage be only momentary in nature.

It is therefore a primary object of our invention to provide means which will both remove feathers and hold the fowl in position against a primary feather removing disc.

It is a further object of our invention to provide a secondary feather removing means and a device of the type described in which the said secondary means are so positioned as to provide compartments about the circumference of the main casing.

It is still another object of our invention to provide a device in which the fowl or the like is prevented from becoming wedged between the revolving disc and the casing walls.

It is yet another object of our invention to provide a device in which varying amounts of downward pressure are applied directly on the fowl and against the primary feather removing surface.

It is still another primary object of our invention to provide a feather removing means which will not bruise or damage the fowl, and yet will momentarily retard its movement.

Other and further features and objects of the invention will be more apparent to those skilled in the art upon a consideration of the accompanying drawings and following specifications, wherein are disclosed several exemplary embodiments of the invention, with the understanding, however, that such changes may be made therein as fall within the scope of the appended claims, without departing from the spirit of the invention.

In said drawings:

Figure 3 is a top elevational view partly in section looking down into the device similar to that shown in Figure 1, but disclosing another embodiment of our invention.

Figure 4 is a cross sectional view on an enlarged scale taken at line 4—4 of Figure 3.

Figure 5 is a cut-away top view similar to Figure 3, but showing another embodiment of our invention in which the secondary defeathering means are comprised of inwardly extending flaps.

Figure 6 is a cut-away cross sectional view on an enlarged scale taken on a line 6—6 of Figure 5 to show the secondary feather removing means in a vertical position.

Figure 7 is a top view showing yet another embodiment of our invention in which three drums extend inwardly to form the secondary feather removing means, and Figure 8 is a cross sectional view of the device shown in Figure 7, showing the horizontally mounted drums and the power drive means employed in driving the primary feather removing means.

Figure 1:
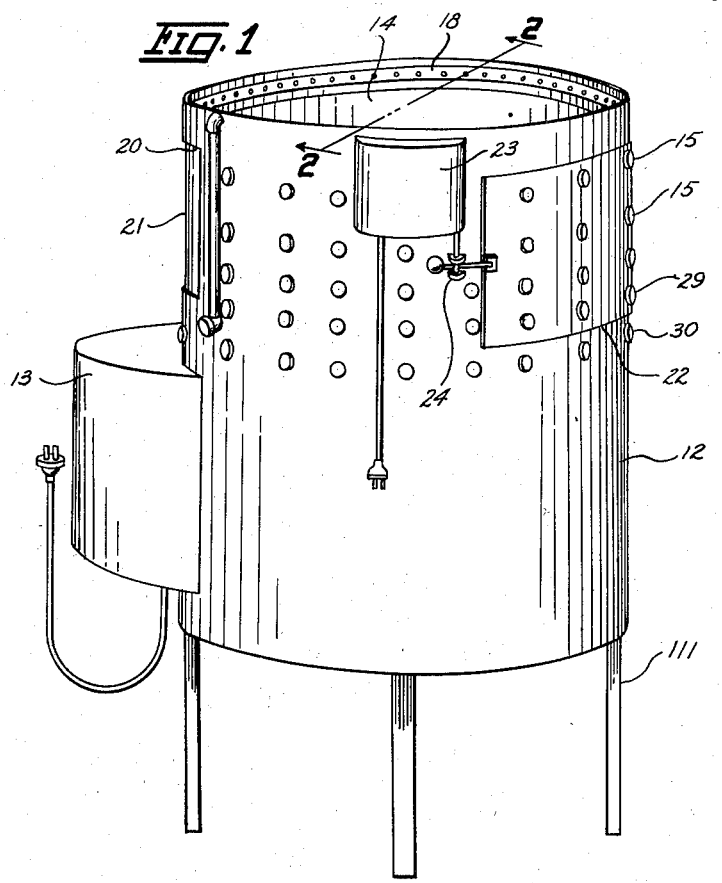
Figure 1 is a view in perspective showing the outward appearance of the device constructed according to our invention.

Referring now to the drawings, and particularly to Figure 1; generally, a disc-type feather removing machine, constructed according to our invention, includes a main frame member 11 which supports the cylindrical casing 12.

This frame includes legs 111 joined at their upper ends by rings 112 and 113. A pair of cross members 114 and 115 have collars 116 and 117 in which a fixed shaft housing 161 is mounted. A shaft 162 is mounted for rotation within housing 161 and a picker disc 16 is mounted on the upper end of the shaft. Upwardly projecting feather removing means 17 are mounted on the disc as by inserting a grooved lower portion thereof through holes in the disc.

A casing 12 which, in this case, is cylindrical in form, is secured at its lower portion to the outer faces of rings 112 and 113. The upper end of the casing is of course open, as shown at 14. Inwardly projecting feather removing means 15 are secured to the upper portion of the casing in an arrangement, more particularly hereinafter described. A motor housing 13 is preferably mounted on the outside of the casing 12. A water spray pipe 18 is positioned on the inside of the upper lip of the casing, and has a series of openings adapted to direct water into the inside of the machine, and particularly toward the feather removing elements.

In operation, an opening 20 is provided in the side of the casing. This opening is covered with a rubber flap such as shown at 21 of Figure 2. The fowl are injected into the machine through this opening.

After the disc is revolved for a sufficient length of time to cause the removal of the feathers, the fowl are withdrawn from the machine through a door such as is shown at 22 of Figure 1. This door may be operated either manually or by a time control device, indicated generally at 23, through a latch means 24.

The disc is driven through a pulley 25 and a belt 26, which is in turn powered by the motor 27. A shield member 28 is provided to protect the drive mechanism.

The operation of this type machine is more fully described in our co-pending application Serial No. 489,468 which issued as U. S. Patent No. 2,777,158 on January 15, 1957. The present invention is directed more particularly to the nature of the secondary feather removing means—that is, the means mounted on the casing wall above the vertical disc. Numerous devices may be utilized for this purpose, but it is necessary that they share several operating characteristics in common in order to be effective; first, in themselves removing feathers from the bird and, second, in causing the fowl to be brought into effective operating contact with the feather removing means on the rotating disc.

Referring to Figure 1, it will be noted that the feather removing means 15, the inner ends 19 of which extend into the casing, are disposed in vertical rows spaced apart at some distance. This distance should be sufficient to permit the fowl to nest between the adjacent rows of feather removing means and to be held there, yet the distance should not be such that the fowl will become permanently wedged between these feather removing means.

It is desirable that the fowl be held for only a very short period of time in the one position about the wall of the casing, yet it is necessary that it be held momentarily in order for the feather removing means on the rotating disc to do their part in removing feathers from the bird. It is, of course, obvious that as the fowl is moved about the walls of the casing, the feather removing means 19 therein will also remove feathers.

A second group of feather removing means 29 and 30 are provided and adapted to project inwardly along side of the upright feather removing means on the disc itself. These means perform yet a third function beyond that of momentarily holding the bird and removing feathers—that is, they prevent the bird or its wings or legs from becoming wedged between the edge of the disc and the casing. Therefore these two horizontal rows of feather removing means are spaced much closer together, and in view of the rotary motion of the bird itself, presents what amounts to a solid wall.

As previously stated, numerous means may be provided to secure the desired operative results required of the secondary feather removing means.

Figure 3 discloses another embodiment of our invention. In this figure, the secondary feather removing means includes a loosely mounted rubber or plastic resilient strip 31, which extends entirely around the inner wall of the casing above the rotating disc. This strip is held in position by a series of vertical straps 32, which are bolted to the casing at both ends by fasteners 33 and 34. This resilient strip is of substantially greater length than the circumference of the casing itself, which in turn results in the strip's bulging inwardly, as indicated at points 35 and 36.

Since the strip 31 is loosely held in relation to the casing, it is possible to make varying adjustments in these bulges or rolls. For example, every other roll may be pulled inwardly toward the center of the machine, while the adjacent roll becomes flattened against the side of the machine. This adjustment is desirable to accommodate various sizes and types of fowl, in view of the differing picking actions required as between such varying sizes. For example, the requirement for effective results varies between the small broiler-type chicken and the large tom turkey, since the size and weights are so greatly different. It will be noted that this embodiment of the invention also has a series of feather removing means 29a and 30a about the lower portion of the casing adjacent to the revolving disc.

Still another embodiment of our invention is shown in Figures 5 and 6. In this instance, the rotating disc is similarly positioned as before. A series of feather removing means 30b are disposed about this rotating disc again to prevent the fowl from becoming wedged between the disc and the casing wall.

In this embodiment, however, a series of vertically disposed flaps 37 and 38 are mounted on the walls of the casing and extend inwardly into the interior of the machine above the rotating disc. These again are spaced apart. In Figure 5 is shown flaps disposed at 90 degree intervals to provide the necessary spacing and compartment.

The shape of these flaps 37 is generally that of an L. The portion 38, which is immediately adjacent to the wall of the casing, extends downwardly to a point just above the rotating disc. This lower edge 39 performs a function similar to that of the feather removing means 29 in the previous embodiments described. The other flap extends inwardly toward the center of the machine. This portion, indicated generally at 40, also extends downwardly toward the rotating disc. It will be at once apparent that the lower edge 41 of this downwardly extending portion will serve both as a feather removing means, and as a means to hold the bird in contact with the rotating disc. Of course the exact shape of this flap may be varied, provided these two primary functions are carried out—that is, first, of guarding the bird against being caught between the disc and the walls of the casing, and, second, of holding the bird in contact with the feather removing means on the rotating disc.

It is also to be noted that the flaps also present a third operative surface in the form of the vertical edge, which again both removes feathers and causes momentary stoppage of the bird.

Still another embodiment of our invention is shown in Figures 7 and 8. In this embodiment, the casing 12 and the disc 16 are similar to the device shown in Figures 1 and 2. The disc contains a plurality of upwardly extending feather removing means, such as 43 and 44. However, the secondary feather removing means in this instance includes a plurality of power driven shafts 45, 46 and 47 which have mounted thereon a number of feather removing members, such as 48 and 49. Each individual shaft is driven through a reduction gear by its own motor.

In operation, the direction of rotation of the lower disc, viewed from above, may be clockwise. The direction of rotation of the power driven shaft, viewed from the inner end, is also clockwise. In this manner, the actual directional movement of the ends of the feather removing means on both the disc and the shafts is opposite to each other. It will be readily apparent that under these circumstances, the opposite forces will tend to retard the movement of the bird in relation to the revolving disc, imparting a rolling action and a stopping action at the same time.

It will also be noted that these shafts are positioned at a distance from one another about the circumference of the casing, with the result that compartments are provided by virtue of the positioning of the devices. Here again the dual functions of the feather removing means are carried out—that is, to slow the movement of the bird about the interior of the casing and, at the same time, urge it firmly into contact with the lower disc.

In this embodiment of the invention, we have employed a different means for preventing the poultry from becoming caught between the revolving disc and the casing. In this instance, the means includes a bumper preferably formed as an inwardly bulging strip of resilient material, semi-circular in cross section, extending at least part way around the inner walls of the casing, adjacent to the revolving disc. This annular bumper is shown at 53. The function of this means is readily apparent. It may be constructed of either rubber or a pliable plastic. However, rubber would be more desirable inasmuch as it has a capacity to remove feathers as well as guarding the birds in relation to the edge of the disc. Of course this same means may be readily employed, in any of the other embodiments disclosed, in place of the feather removing means 29 and 30 or 29a and 30a, or 30b.

Figure 2:
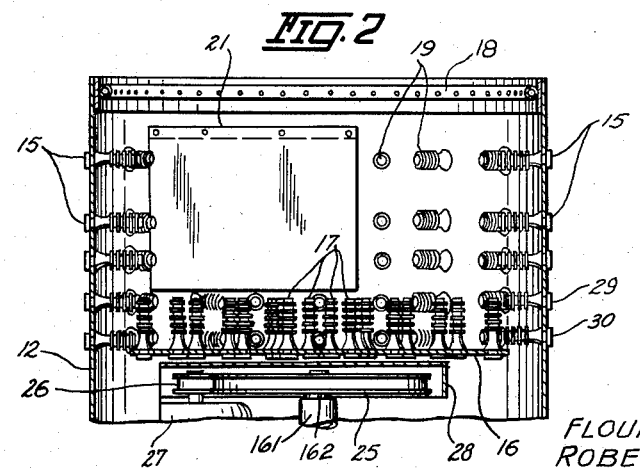
Figure 2 is a cross sectional view of the interior of the device shown in Figure 1 taken along line 2—2 thereof, showing the primary and secondary feather removing means according to one embodiment of our invention.

It will be noted, too, that the embodiment shown in Figures 7 and 8 includes an opening 20, flap 17, and door 22 in the same manner as shown in Figures 1 and 2. The method of handling the fowl in and out of the machine is the same in this embodiment as previously described in the other embodiment of this invention.

From the foregoing, it will be seen that the applicants have provided means to achieve the desired results—that is, a secondary feather removing means which also serves to retard the movement of the fowl in relation to the primary feather removing means or the rotating discs and, at the same time, bias the bird downward against this rotating disc in order to increase its effectiveness as a feather removing portion of the machine.

Experience has proven that the average fowl can withstand considerable violent action and heavy pressure to accomplish the removal of the feathers so long as those pressures are not applied at any one point for a great length of time, and so long as the fowl is not brought into sharp contact with a solid object within the machine to such an extent as to cause the breakage of bones and the like. Obviously sufficient spacing of the secondary feather removing means around the circumference of the casing is of extreme importance to prevent the bird from becoming lodged or enmeshed in the removal means and thus "hung up." The several embodiments herein disclosed achieve the desired results.

While we have shown, as the feather removing means, a cylindrical body of resilient material such as rubber or the like, it is to be understood that we are not limited in our choice of such members, but that other forms may be employed.

Although we have described several specific embodiments of our invention, it is apparent that modifications thereof may be made by those skilled in the art. Such modifications may be made without departing from the spirit and scope of the invention as set forth in the appended claims.

We claim as our invention:

1. A poultry picking machine comprising an upwardly disposed casing, a rotatable disc adjacent one end of said casing, disc rotating means operatively connected to said disc for supporting and rotating the same, a plurality of resilient picking members mounted on and extending from a major portion of said disc toward the interior of said casing, and a poultry retarding means comprising a loosely-held strip mounted on and secured to the inner wall of said casing.

2. A poultry picking machine as set forth in claim 1 wherein said poultry retarding means comprise a circular band of resilient material having a circumferential dimension greater than the perimetrical dimension of the inner surface of said casing, said circular band being secured at spaced intervals to the inner surface of said casing to provide a plurality of inwardly extending folds for engaging and retarding the movement of poultry.

3. A poultry picking machine as set forth in claim 2 having a plurality of inwardly extending resilient poultry picking members secured to the inner surface of said casing below said circular band and positioned beside said poultry picking members mounted on said disc.

4. A poultry picking machine as set forth in claim 2 having a laterally, inwardly extending poultry engaging means secured to the inner surface of said casing below said circular band and extending over the edge of said disc.

References Cited in the file of this patent

UNITED STATES PATENTS

| 777,590 | De Bonneville | Dec. 13, 1904 |
| 2,472,468 | Digby | June 7, 1949 |
| 2,571,034 | Harvey | Oct. 9, 1951 |
| 2,777,158 | Pitts et al. | Jan. 15, 1957 |

FOREIGN PATENTS

| 10,325 | Great Britain | 1886 |